May 30, 1933.  M. W. DAVIS ET AL  1,911,608
PRESSURE VESSEL LINING
Filed Dec. 2, 1930

INVENTORS
MANLEY W. DAVIS
WALLACE C. JOHNSON
BY J.D.O'Connell
ATTORNEY

Patented May 30, 1933

1,911,608

UNITED STATES PATENT OFFICE

MANLEY W. DAVIS, OF MONTREAL, QUEBEC, CANADA, AND WALLACE C. JOHNSON, OF NEWARK, NEW JERSEY

PRESSURE VESSEL LINING

Application filed December 2, 1930. Serial No. 499,544.

This invention relates to the lining of pressure vessels and other containers and has particular reference to pressure vessels adapted to contain chemicals or to be used in carrying out various chemical processes such, for example, as the digesting of fibrous materials in the manufacture of pulp for paper making and allied purposes.

Certain types of pressure vessels are provided with an outer steel shell having a lining of corrosion resistant alloy. For economical reasons the lining is made of the minimum practicable thickness and is usually of such inherent weakness as to require support from the outer shell in order to retain its form and to sustain the internal pressures to which it is subjected in service. This requires accurate shaping and fitting of the lining to the inner surface of the shell and adds materially to the cost of construction and installation. In some instances a continuous bond is provided between the lining and the shell while in other instances the lining is fastened to the shell at frequent intervals. Both methods of fastening are unsatisfactory and result in damage to the lining or its fastening means, due to the fact that the lining and the shell have different co-efficient of expansion. Such damage is also apt to ensue if there is any inaccuracy in the fitting of the lining to the inner surface of the shell.

In order to overcome these difficulties, the present invention contemplates the introduction of a non-corrosive fluid between the lining and the shell and the placing of such fluid under a pressure approximately equal to the pressure acting against the inner surface of the lining. The lining is thus substantially relieved of tension due to internal pressure since such pressure is approximately equalized by the opposing pressure of the fluid acting on the outer surface of the lining. The lining and the shell are spaced apart in a predetermined manner for the introduction of the fluid and to permit the lining to expand or contract independently of the shell. Between its points of rigid support the lining is also capable of inward and outward deflection without subjecting the fastenings to excessive strains.

Proceeding now to a more detailed discussion of the invention, reference will be had to the accompanying drawing, wherein Figure 1 is a vertical sectional view of a vessel and pressure applying means constructed in accordance with this invention.

Figure 1:
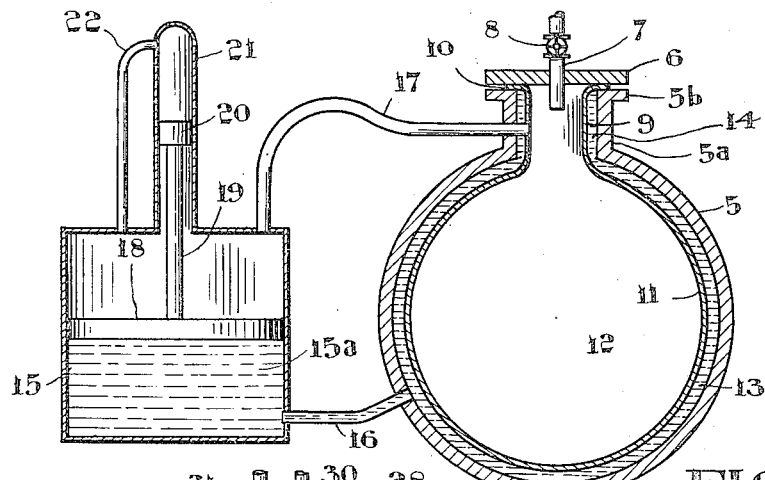

The pressure vessel shown in Fig. 1 is provided with an outer shell 5 made of steel or other metal having the requisite strength to withstand the internal pressures to which the shell is subjected in service. The said shell is formed with a neck 5a terminating in an outwardly directed flange 5b. A cover 6 is bolted or otherwise secured to the flange 5b and is provided with a pipe connection 7 equipped with a control valve 8. The pipe connection 7 may be utilized for both charging and discharging purposes, or any other suitable arrangement may be substituted for the introduction and discharge of material to be contained or treated in the vessel 5. A lining sleeve 9 made of a suitable corrosion resistant alloy or other material extends loosely through the neck 5a in spaced relation thereto. The upper end of this sleeve terminates in an outwardly directed flange 10 which is clamped between the flange 5b and the cover 6. The lower end of the sleeve is formed integral with a body lining 11 of the same material. The body lining 11 encloses a space 12 for the chemical or heat treatment of materials introduced through the pipe connection 7. The body lining 11 is also roughly shaped to conform generally to the contour of the shell 5 and is spaced from the latter to provide an intervening space 13 communicating with the space 14 reserved between the sleeve 9 and the neck 5a. The space 13 is placed in communication with the lower portion of a tank 15 by means of a pipe connection 16. The upper portion of the tank 15 communicates with the space 12 through the medium of a pipe connection 17. A floating piston 18 operates in the tank 15 and is connected by a stem 19 to a floating piston 20. The piston 20 is of considerably smaller diameter as compared with the piston 18 and operates in a cylindrical extension 21 formed integral with the top wall of the tank 15. A pipe 22 places the upper end of the extension 21 in communication with the upper portion of the tank 15. As indicated at 15a an inert and substantially non-corrosive fluid substance, is placed in the tank 15 below the piston 18 and is adapted to flow through the pipe 16 into the spaces 13 and 14 reserved between the lining and the shell. This fluid substance may be oil or any other suitable liquid or gas. When pressure is generated in the space 12 it acts through the pipe connections 17 and 22 on the upper surfaces of the pistons 18 and 20 and causes the fluid substance filling the spaces 13 and 14 to be placed under a pressure approximately equal to that in the space 12. In this construction the piston 18 serves to prevent intermingling of the fluid medium 15a with the gaseous or other pressure applying substance admitted to the upper portion of the tank through the pipe connection 17. If a liquid is used for filling the spaces 13 and 14 it is possible that, in some instances, the head or static pressure exerted against the outer surface of the lining when the space 12 is empty may tend to crush the lining inwardly. This tendency in vessels of small size, such as shown in Fig. 1, is not of sufficient magnitude to injure the lining and, for vessels of this size, no special precautions need be observed. When dealing with larger vessels, wherein the lining is of large area and comparatively weak, it is advisable to avoid the existence of excessive static or head pressures acting against either the inner or the outer surfaces of the lining. One method of accomplishing this is illustrated to advantage in Fig. 2, wherein we have shown a large pressure vessel such, for example, as a digestor commonly used for digesting fibrous vegetable materials with chemical reagents for the manufacture of paper and similar pulp.

Figure 2:
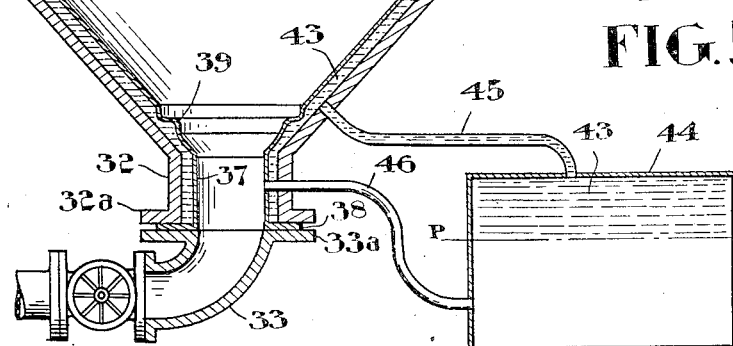
Figure 2 is a view similar to Fig. 1, but showing a modification particularly adapted for pressure vessels of larger size.

The shell 25 shown in Fig. 2 is provided with an upper neck portion 26 terminating in an outwardly directed flange 27. A cover 28 having a lining 29 of a suitable corrosion resistant alloy or other suitable material is bolted or otherwise fastened to the flange 27. This cover is provided with valved pipe connections 30 and 31 for the admission and discharge of liquid or gaseous materials. The lower portion of shell 25 tapers inwardly and terminates in a lower neck 32 provided with an outwardly directed flange 32a to which is attached the flange 33a of a valved outlet connection 33, through which the fibrous material is discharged from the space 25a upon completion of the digesting operation. The body lining indicated at 34 is provided with an upper tubular extension 35 spaced inwardly from the neck 26. This extension 35 terminates in an outwardly directed flange 36 which is clamped between the flange 27 and the cover 28. The lower portion of the body lining is tapered to conform to the tapered lower portion of the shell 25 and terminates in a tubular extension 37, which is spaced inwardly from the neck 32. The extension 37 is also provided with an outwardly directed flange 38 which is clamped between the flanges 32a and 33a. Adjacent the inner ends of the extensions, 35 and 37, the body lining is corrugated as indicated at 39. These corrugations permit the lining to be expanded and contracted independently of the shell 25. Additional outlets for drawing off gas or fluid from the space 25a may be provided in the form of pipes 40 extending through the shell 25 and having their inner ends attached to the lining in any desired manner. Circular or other corrugations 41 may be formed in the lining around the pipes 40 for expansion and contraction purposes. The space 42 reserved between the lining and the tank is adapted to be filled with a relatively non-corrosive fluid supplied from a tank 44 through a pipe connection 45 leading from the top of said tank. Tank 44 is also in communication with the space 25a through the medium of a pipe 46 leading from the bottom of the tank to an opening in the extension 37 of the lining. With this construction, a portion of the cooking liquor employed in the digesting process enters the lower portion of the tank 44 through the pipe connection 46 and forces the non-corrosive fluid 43 through the pipe connection 45 and into the space 42. The specific gravity of the non-corrosive fluid 43 is less than that of the cooking liquor so that the two fluids will separate along a variable plane P—P, the location or elevation of which will depend upon the pressure generated in the space 25a during the digesting process. In this way the pressure generated in the space 25a during the digesting process is applied to the fluid 43 in the space 42 and causes the same to exert an approximately equal pressure against the outer surface of the lining. If the non-corrosive fluid 43 be in the form of a liquid, it is apparent that the hydraulic heads existing in the spaces 25a and 42 will be approximately equalized. The tank 44 is shown positioned below the space 25a, but this is not essential as the said tank may be positioned at a higher level if it is desired to maintain some residual hydraulic head of liquid in the space 42, after the space 25a has been emptied of its contents.

When, upon completion of the digesting process, the space 25a is emptied of its contents, the lowering or elimination of the pressure acting on the fluid 43 permits this fluid to drain back to the tank 44 through the pipe connection 45. A certain amount of the cooking liquor will, however, be trapped in the lower portion of the tank 44 and in the pipe 46 so that escape of the non-corrosive fluid 43 from the tank 44 is effectively prevented. When the fluid 43 is returned to the tank 44 from the space 42, air may be admitted into the upper portion of said space through a pipe connection 47 equipped with an inwardly opening check valve 48. The space 42 may also be provided with an air vent 49 to permit escape of air from said space as the fluid 43 rises therein under pressure applied as previously described. Any suitable float valve controlling means may be associated with the air vent to close the same when the fluid 43 rises in the space 42 to the level of the vent.

Figures 3, 4:
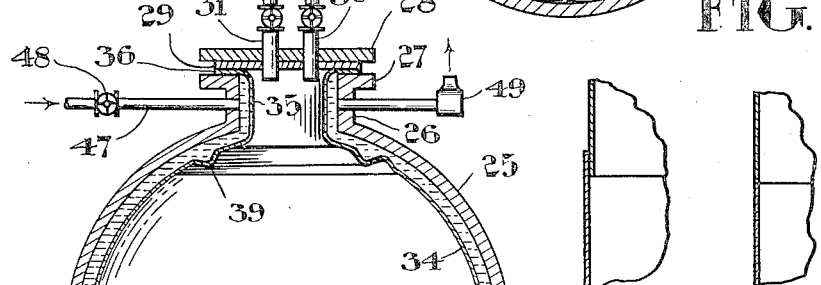
Figures 3, 4 and 5 are fragmentary sectional views illustrating modifications to the lining structure.
Figure 5:
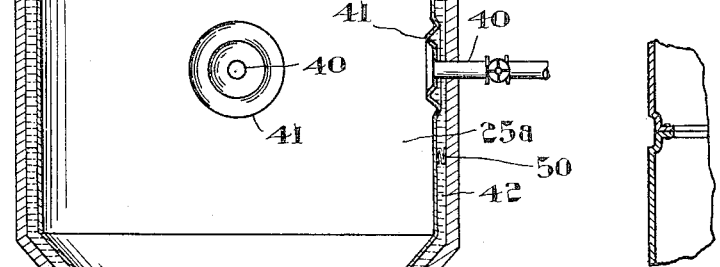

In Figs. 1 and 2 the lining is shown as a single integral structure for the sake of clearness. In actual practice, however, the lining may consist of preformed sheets or sections fastened together in any convenient or desirable manner. The sheets or sections may be butt welded as shown in Fig. 4; lap welded as shown in Fig. 3; or may have their adjacent edges flanged as shown in Fig. 5 and riveted together to provide a connection in the nature of an expansion joint permitting relative movement of the sheets or sections due to expansion and contraction. In lieu of the arrangement shown in Fig. 5, slip joints or any other suitable type of expansion joints may be embodied in the lining structure within the scope of this invention. If desired flexible straps 50 or other additional fastening means may also be provided for securing the lining to the shell at any desired intervals throughout the length or circumference of the lining.

The two specific applications referred to in the foregoing discussion are merely cited by way of example, as the present invention is intended to be applied to any type of container or pressure vessel to which it is adaptable. It is also to be understood that various modifications may be resorted to within the scope and spirit of the appended claims.

Having thus described our invention, what we claim is:

1. In combination, a pressure vessel comprising an outer metallic shell and a relatively thin lining of corrosive resistant material arranged in said shell to leave a space between the lining and the inner surface of the shell, a supply tank containing a non-corrosive fluid, means for conducting fluid from the tank to the space reserved between the lining and the shell and means for placing the upper portion of the tank in communication with the interior of the pressure vessel so that the pressure developed in said vessel acts on the upper surface of the liquid in the tank to maintain corresponding pressure on the liquid occupying the space between the lining and the outer shell of the vessel.

2. In combination, a pressure vessel comprising an outer metallic shell and a relatively thin lining of corrosive resistant material arranged in said shell to leave a space between the lining and the inner surface of the shell, a supply tank containing a non-corrosive fluid, said tank presenting a lower portion of relatively large diameter and an upper portion of relatively small diameter, a relatively large piston movable in the lower portion of said tank, a relatively small piston movable in the upper portion of said tank and rigidly connected to the lower piston, a pipe leading from the bottom of the lower portion of the tank to the space reserved between the outer shell and lining of the pressure vessel, a pipe leading from the top of the lower portion of the tank to the interior of the pressure vessel and a third pipe leading from the top of the lower portion of the tank to the top of the upper portion.

3. In combination, a pressure vessel comprising an outer metallic shell and a relatively thin lining of corrosive resistant material arranged in said shell to leave a space between the lining and the inner surface of the shell, a supply tank containing a non-corrosive fluid, and conduits connecting said tank with the interior of said vessel and with the space between the lining and the inner surface of the vessel shell so that the pressure developed in said vessel acts to force the non-corrosive fluid from the supply tank into the space between the lining and the inner surface of the shell, the arrangement being such that the non-corrosive fluid serves as a fluid seal for preventing transfer of the contents of the vessel to the space between the lining and the inner surface of the shell.

In witness whereof, we have hereunto set our hands.

MANLEY W. DAVIS.
WALLACE C. JOHNSON.